United States Patent [19]

Kim

[11] Patent Number: 4,477,707

[45] Date of Patent: Oct. 16, 1984

[54] ELECTROMAGNETIC FIELD HEATING APPARATUS FOR CURING RESIN/FIBER COMPOSITES IN CONTINUOUS PULTRUSION PROCESSES

[75] Inventor: Wontaik Kim, Clifton Park, N.Y.

[73] Assignee: General Electric Company, Schenectady, N.Y.

[21] Appl. No.: 444,273

[22] Filed: Nov. 24, 1982

[51] Int. Cl.$^3$ .............................................. H05B 9/06
[52] U.S. Cl. ..................... 219/10.55 A; 219/10.55 M; 219/10.55 F; 219/10.55 R; 219/10.61 R; 156/272.4
[58] Field of Search ................. 219/10.55 A, 10.55 R, 219/10.55 M, 10.55 F, 10.61 R; 34/1; 156/273

[56] References Cited

U.S. PATENT DOCUMENTS

| | | | |
|---|---|---|---|
| 2,593,067 | 4/1952 | Spencer | 219/10.55 E |
| 3,560,695 | 2/1971 | Williams et al. | 219/10.55 A |
| 3,999,026 | 12/1976 | Böling | 219/10.55 A |
| 4,093,840 | 6/1978 | Jean et al. | 219/10.55 F |
| 4,186,044 | 1/1980 | Bradley et al. | 219/10.55 A |

Primary Examiner—C. L. Albritton
Assistant Examiner—M. M. Lateef
Attorney, Agent, or Firm—Lawrence D. Cutter; James C. Davis, Jr.; Marvin Snyder

[57] ABSTRACT

In pultrusion processes in which resin/fiber composites are heat cured, nonuniformities in heating can result in lamination defects and other problems in the molded product. The problem of uniform heating for curing becomes more critical as the thickness of the mass being molded and cured increases. In accordance with a preferred embodiment of the present invention, heating uniformity problems are solved by employing an apparatus and method in which the mass to be cured is heated in an electromagnetic field to ensure thorough and uniform curing temperatures throughout the thickness of the mass. The present invention preferably employs a pair of electromagnetic wave generators operating either in phase or 180° out of phase depending upon the dielectric properties of the material being cured and also upon the thickness of the mass being cured.

10 Claims, 4 Drawing Figures

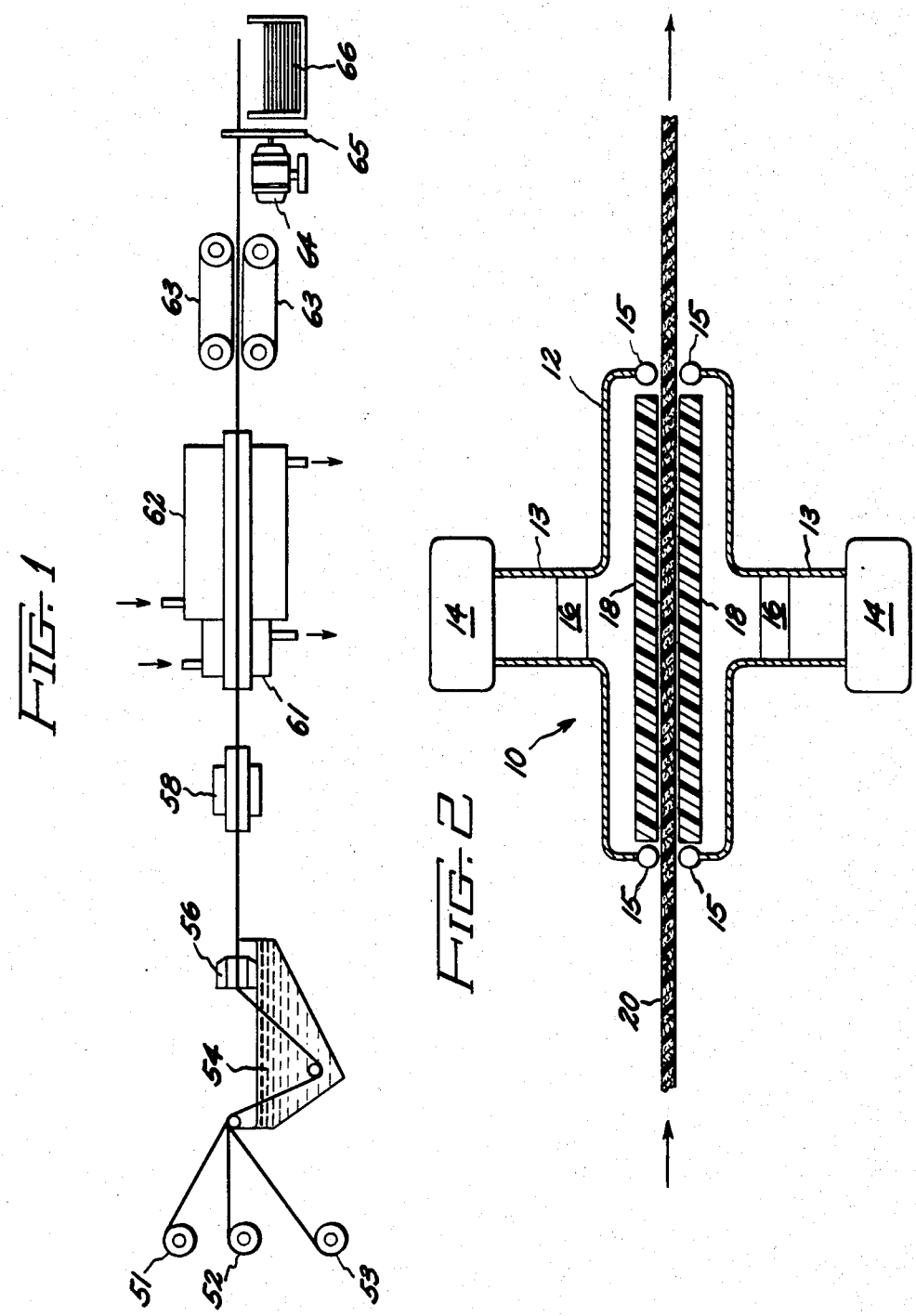

ELECTROMAGNETIC FIELD HEATING APPARATUS FOR CURING RESIN/FIBER COMPOSITES IN CONTINUOUS PULTRUSION PROCESSES

BACKGROUND OF THE DISCLOSURE

The present invention is generally related to an apparatus and a method for curing composite resin/fiber mixtures using microwave wavelength electromagnetic radiation to ensure uniformity of curing temperature.

The pultrusion process is a conventional process in which strands of fibrous material, such as glass fiber or graphite fiber, are impregnated in a polymer resin bath and pulled through one or more dies or preformers prior to curing the resultant shape in a temperature controlled environment. The pultrusion process has been particularly useful in the production of thin tape or ribbons or in the production of rod-shaped masses exhibiting relatively small radius. Conventional heated dies have performed satisfactorily in manufacturing these thin tapes and small radius rods even though the pulling speed is generally less than desirable. However, for thick tape or large diameter rod shaping, nonuniform cure can result in warp or delamination of the final product. Because of the poor thermal conductivity of the polymer resin/fiber composite systems, nonuniform heating and uncontrollable chemical reactions appear to result and to thereby effect a reduction in the strength of the cured product. The most important technical aspect of the whole pultrusion process is the thermal control of cure or hardening during the pulling operation. This is particularly true in the curing of thick sections (over 3 centimeters) in the pultrusion process. Such thick sections have exhibited a tendency for internal cracking and delamination Conventionally heated dies have not proven to be a satisfactory solution to this problem which appears to be due to the low thermal conductivity of the resin/fiber composite being cured. The heat of reaction released locally is therefore not quickly distributed throughout the workpiece and, accordingly, large temperature gradients can exist. This results in localized heating which further accelerates the local reaction and worsens the curing problem. It is therefore desirable to obtain a system for heating and curing the entire thick composite section simultaneously throughout the mass with the lowest possible heat input.

SUMMARY OF THE INVENTION

In accordance with a preferred embodiment of the present invention, an apparatus for curing resin impregnated fiber workpieces comprises an electrically conductive cavity for supporting standing electromagnetic waves, the cavity having apertures through which the workpiece is introduced and removed, together with the means for generating electromagnetic waves and means for coupling the electromagnetic wave generating means to the interior of the cavity. The present invention preferably includes a pair of microwave energy generators disposed on opposite sides of the workpiece and operated in one of two modes depending upon the thickness and dielectric properties of the workpiece. In particular, the microwave energy generators employed may be operated either in a synchronous phase relationship or in a phase relationship shifted by 180°. Furthermore, for many materials, the apparatus preferably includes a forming die disposed within the cavity and comprising a material which is relatively insusceptible to heating by exposure to applied electromagnetic radiation. Accordingly, a method for curing resin-impregnated fiber masses is also an embodiment of the present invention in which the workpieces are subjected to a substantially uniform field of electromagnetic radiation.

Accordingly, it is an object of the present invention to provide an apparatus for curing polymer resin/fiber composite workpieces in a thorough, temperature-controlled yet uniform environment so as to reduce problems associated with local variations in cure rate which tend to produce problems of warping and delamination, particularly in thick workpieces subjected to pultrusion processes.

Lastly, it is an object of the present invention to provide a method and apparatus for curing polymer resin/fiber composite systems which exhibit relatively low thermal conductivity and/or for which it is desirable to produce relatively thick molded products.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a side, schematic view illustrating a system for performing the conventional pultrusion process;

FIG. 2 is a cross-sectional side elevation view of a curing apparatus in accordance with the present invention;

DETAILED DESCRIPTION OF THE INVENTION

Figure 3:
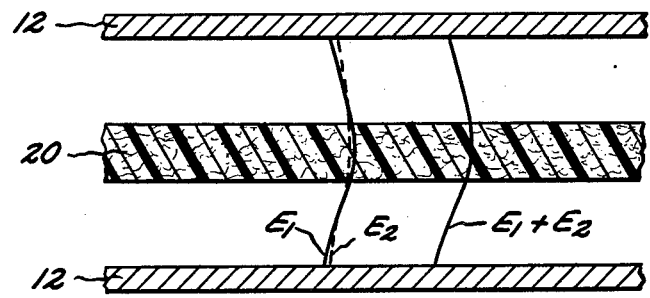
FIG. 3 is a cross-sectional, side elevation view particularly illustrating electric field profiles present during phase synchronized operation.
Figure 4:
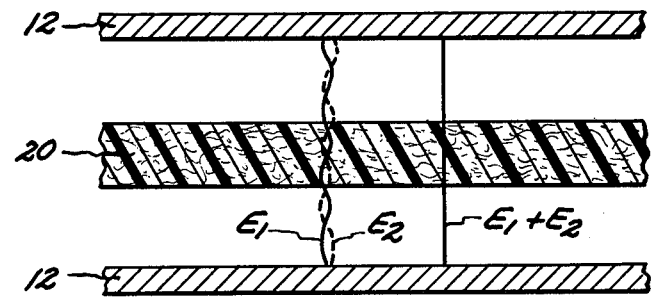
FIG. 4 is a view similar to FIG. 3 except illustrating the use of microwave generators operating at a phase difference of 180°.

FIG. 1 illustrates, in a schematic fashion, a conventional pultrusion processing apparatus. Spools 51, 52 and 53 of fiber material are pulled together through resin impregnation bath 54. The fiber material may comprise substances such as glass fiber or graphite fiber. Resin bath 54 may comprise, for example, an epoxy resin material. Control of wetting of the resin to the fibers is an important factor in product properties and quality. In a moving production line, simple orifices, such as may be provided in die 56, serve as metering devices for control of resin content in the product. However, orifices also impose certain limits on the rate of production, since they force excess resin backwards and can produce large hydraulic pressures which may be sufficient to disrupt some reinforcement fibers. Because almost all reinforcement materials exhibit a spring constant or bulk factor, the die itself is typically approached with a slight excess of resin in order to compact the fiber material and expel any air that may be present.

The composite fiber/resin material from die 56 is supplied to shape preformer 58 in which the composite is preformed to an approximately final shape before the last molding step. For example, some shapes include flat angles and cylinders for hollow pipe structures. Preforming is usually accomplished gradually with careful attention to holding the desired fiber orientation and making full use of mechanical aids such as spiders, tubes, combs and ring guides. The die materials for the continuous pull process and cure illustrated generally comprise chrome-plated steel. Metal dies used in continuous cure processes typically require a separate cooling junction or entrance section to prevent premature hardening of the resin, which, as stated above, is in slight excess at these early stages in the process. Water cooling of a short cored or jacketed section 61 of the die performs a useful function in this regard. In particular, as a result of viscous friction heating, due to the material being pulled through various die shapes, the material may exhibit a temperature profile through its cross section in which surface temperatures are generally higher. Since an elevated temperature environment could exacerbate thermal noounifornities, it is generally preferable to provide a separate cooling junction or cold entrance section 61 to reduce the temperature of the composite material to be molded to a uniform level.

Curing of the composite fiber/resin material occurs within temperature-controlled environment 62. Since thermosetting resins require a careful thermal control to produce quality materials, for continuous cure in metal die, the exothermic point must be kept within the die length and the temperatures should be controlled within a degree or two. Electric heaters, hot steam or hot oils are typically used for heating the molding dies with environment 62. However, the uniform cure of a thick section, as described above, can be difficult to achieve. However, the present invention, one embodiment of which is illustrated in FIG. 2, alleviates this problem.

In the final stages of pultrusion processing, the workpiece is passed through puller 63 which may vary widely in construction depending upon the forces required. Simple belt-type pullers, such as those shown in FIG. 2, are used for providing moderate pulling forces. However, tractor-type pullers are used in pultrusion applications in which stronger forces are required.

Following pulling of the workpiece, the cured and molded composite is cut into lengths by disc cutter 65 driven by motor 64. The resulting workpiece lengths are stacked in bin 66.

FIG. 2 illustrates an apparatus in accordance with a preferred embodiment of the present invention for curing resin/fiber composite materials by means of heat treatment in an electromagnetic field, such as is provided by electromagnetic wave generators 14, typically operating in the microwave region of the electromagnetic spectrum. In particular, wave generators 14, preferably disposed on opposite sides of the workpiece 20, are configured to provide standing wave electromagnetic radiation within the cavity defined by electrically-conductive housing 12. Housing 12 possesses an inlet aperture through which the workpiece is inserted and an exit aperture through which the cured workpiece is removed. Housing 12 also preferably includes tunable tunnel sections 13 for coupling the output of wave generators 14 to the cavity defined by housing 12. Additionally, it is also preferable to employ an electromagnetic wave choking device 15 disposed near the apertures to prevent radiation energy leakage to the surroundings. Also, the cavity defined by housing 12 may also contain a forming die which preferably comprises a material which does not itself heat up in the presence of microwave radiation. Forming die 18 may or may not be employed depending upon the desired shape of the final product. In particular, it is noted that a material such as polytetrafluoroethylene (PTFE) may be advantageously employed as a material for forming die 18. Moreover, while die 18 is shown as having a relatively flat or cylindrical shape, other shapes for this die are, of course, employable. It is also preferably to employ a reflection matching device 16 to redirect the reflected wave from the workpiece surface in such a fashion that standing waves persist in the device cavity.

To achieve uniform heating of a thick workpiece section, the applied wavelength should be larger than the thickness of the thick section. If the section coincides with the maximum of the electomagnetic heating potential distribution in the thickness direction, high heating efficiency is achieved. This situation is shown in FIG. 3. Therefore, an appropriate frequency with high energy intensity can be selected for the electromagnetic wave generator if the electric properties and thickness of the resin/fiber system are known. Depending upon the dielectric properties of the resin/fiber system, the choice of frequency with a wavelength larger than the thickness of the section can, in fact, turn out to provide a low energy density and low heat energy to the workpiece. In such a case, a different frequency with a higher energy intensity is preferably employed to achieve a high efficiency operation mode. In this situation, the present invention operates wave generators 14 in a phase shifted mode in which the phase difference between the two wave generators 14 is 180°. In this case, the frequency of the generator is selected to be significantly higher than that shown in FIG. 3. However, in both cases, the consequence is that a uniformly-enhanced heating cross section is achieved. For any given resin/fiber composite it is therefore generally desirable to investigate certain dielectric properties of the composite to determine which of these two modes of operation is most appropriate. In particular, it is desirable to ascertain such quantities as the dielelectric coefficient $E_r$, the dielectric conductivity, $\sigma$, and the loss tangent, $\tan \delta$ for the pultruded composite.

From the above, it should be appreciated that the present invention provides a method and apparatus for uniformly heat curing resin/fiber composite materials. It should be further appreciated that the product of the present invention exhibits superior qualities as a result of the uniform cure rate throughout workpieces which are either relatively thick or possess unique dielectric properties. In particular, it is seen that the method and apparatus of the present invention mitigate problems of delamination and reduced strength because of nonuniform temperature profiles that can exist in the composite material particularly as a result of poor thermal conductivity of composite system.

It should also be appreciated that the method and apparatus of the present invention is operable with a plurality of composite materials exhibiting different thicknesses, and dielectric and thermal properties. In particular, a preferred embodiment of the apparatus of the present invention employs a pair of electromagnetic wave generators which may be operated either in phase or out of phase and which are adaptable for operation at low and high frequency ranges to accomodate these variations in material properties and geometry.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An apparatus, for curing a resin-impregnated fiber workpiece, said apparatus comprising:
   a cavity capable of supporting electromagnetic waves therein, said cavity having at least one aperture therein through which said workpiece may be introduced and removed;
   means for generating standing electromagnetic waves within said cavity, said means including a pair of microwave enegry generators disposed on substantially opposite sides of said cavity, said energy generators operating at the same frequency and configured so as to operate in a phase shift relationship of approximately 180°.

2. The apparatus of claim 1 further including tunnel means for electromagnetically coupling said electromagnetic wave generating means to the interior of said cavity so as establish electromagnetic waves therein.

3. The apparatus of claim 1 in which said cavity has a pair of apertures therein through which said workpiece is introduced and removed.

4. The apparatus of claim 1 in which the wavelength of said electomagnetic waves is chosen to be less than the thickness of said workpiece.

5. The apparatus of claim 1 further including means to inhibit electromagnetic radiation in said cavity from entering the region external to said cavity.

6. The apparatus of claim 1 further including a forming die disposed within said cavity, for shaping of said workpiece.

7. The apparatus of claim 6 in which said forming die comprises polytetrafluoroethylene.

8. The apparatus of claim 2 further including standing wave reflection matching means disposed within said tunnel means.

9. A method for curing a resin-impregnated fiber mass, said method comprising:
   subjecting said mass to a substantially uniform field of microwave electromagnetic energy, said uniform field being provided by a pair of electromagnetic wave-generating means operating in a phase shift relationship of 180° and at the same frequency.

10. The method of claim 9 in which the wavelength of said electromagnetic energy is less than the thickness of the mass to be cured.

* * * * *